United States Patent
Matsuura et al.

(10) Patent No.: US 6,369,523 B2
(45) Date of Patent: Apr. 9, 2002

(54) LUMINESCENCE CONTROLLING APPARATUS, A LUMINESCENCE APPARATUS, AN IMAGE READING APPARATUS AND AN IMAGE FORMING APPARATUS

(75) Inventors: Hideki Matsuura, Aichi-Ken; Akira Takasu, Toyokawa, both of (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/742,400

(22) Filed: Dec. 22, 2000

(30) Foreign Application Priority Data

Jan. 7, 2000 (JP) .......................... 2000-001790

(51) Int. Cl.[7] .............................................. H05B 37/02
(52) U.S. Cl. ...................... 315/291; 315/56; 313/234; 313/523; 313/607; 313/643
(58) Field of Search .................... 315/291, 56, 326; 313/523, 524, 484, 607, 620, 631, 635, 643, 234

(56) References Cited

U.S. PATENT DOCUMENTS

| | | | |
|---|---|---|---|
| 5,432,398 A | * 7/1995 | Kogelschatz | ................ 313/234 |
| 5,514,934 A | 5/1996 | Matsumoto et al. | ........ 313/607 |
| 5,889,366 A | 3/1999 | Yokokawa et al. | ......... 313/607 |
| 5,929,564 A | * 7/1999 | Nakaya et al. | .............. 313/607 |
| 5,998,921 A | * 12/1999 | Nakaya et al. | .............. 313/234 |
| 6,018,218 A | * 1/2000 | Terada et al. | ............... 313/234 |
| 6,031,330 A | * 2/2000 | Yoshida et al. | ............. 313/234 |

OTHER PUBLICATIONS

Patent Abstract of Japan, Publication No. 05–242870 dated Sep. 21, 1993.

* cited by examiner

Primary Examiner—Don Wong
Assistant Examiner—Thuy Vinh Tran
(74) Attorney, Agent, or Firm—Morrison & Foerster LLP

(57) ABSTRACT

A luminescence controlling apparatus includes a rare gas pipe equipped with a pair of electrodes in which rare gas is sealed, a power supply for impressing voltage to the pair of electrodes and an electric charge absorption member for absorbing electrons generated during electric discharge of the rare gas pipe caused by impressing voltage to the pair of electrodes. The absorption member is disposed in the rare gas pipe. The luminescence controlling apparatus further includes a controller for controlling a luminescence amount of the rare gas pipe by adjusting a quantity of electrons absorbed by the electric charge absorption member.

20 Claims, 13 Drawing Sheets

LUMINESCENCE CONTROLLING APPARATUS, A LUMINESCENCE APPARATUS, AN IMAGE READING APPARATUS AND AN IMAGE FORMING APPARATUS

This application claims priority to Japanese Patent Application No. 2000-1790 filed on Jan. 7, 2000, the disclosure of which is incorporated by reference in its entirety.

BACKGROUND OF THE INVENTION

1. Field of the Invention

The present invention relates to a luminescence controlling apparatus, a luminescence apparatus, an image reading apparatus and an image forming apparatus.

2. Description of Related Art

For example, a Japanese Patent Laid-open Publication No.

H5-242870 proposes a luminescence control technology in which a plurality of pairs of electrodes are arranged such that each pair is disposed on a circumference of a discharge lamp along the axial direction of the discharge lamp, and the number of electrodes to which voltage is impressed is selected in order to control the luminescence amount of the discharge lamp.

However, the aforementioned luminescence controlling apparatus has drawbacks such that the structure is complicated since the apparatus has many electrodes for controlling the luminescence of the discharge lamp, which results in an increased manufacturing cost. Furthermore, the luminescence amount can only be changed stepwise by selecting the number of electrodes.

SUMMARY OF THE INVENTION

It is an object of the present invention to provide a luminescence controlling apparatus and a luminescence apparatus which are simple in structure and can perform a continuous and fine luminescence control.

It is another object of the present invention to provide a luminescence controlling apparatus and a luminescence apparatus which has a write-in function to a photosensitive member or the like by partially performing an ON/OFF luminescence control during the electric discharge.

It is still another object of the present invention to provide an image reading apparatus equipped with a luminescence apparatus which can perform a continuous and fine luminescence control as a light source for irradiating an original image.

It is still yet another object of the present invention to provide an image forming apparatus equipped with a luminescence apparatus which can partially perform an ON/OFF luminescence control during the electric discharge, as a light source for exposing a photosensitive member.

According to a first aspect of the present invention, a luminescence controlling apparatus includes a rare gas pipe in which rare gas is sealed, the rare gas pipe being equipped with a pair of electrodes, a power supply for impressing voltage to the pair of electrodes, an electric charge absorption member disposed in the rare gas pipe to absorb electrons generated during electric discharge of the rare gas pipe caused by impressing voltage to the pair of electrodes, and a controller for controlling a luminescence amount of the rare gas pipe by adjusting a quantity of the electrons absorbed by the electric charge absorption member.

With this luminescence controlling apparatus, electrons (electric charges) generated during the electric discharge of the rare gas pipe are absorbed by the charge absorption member like a grid line disposed in the rare gas pipe. Therefore, by adjusting the amount of electrons to be absorbed by the electric charge absorption member, the amount of energy of the electrons colliding with the rare gas atoms can be adjusted, which in turn enables an adjustment of the excitation energy of the fluorescent substance layer formed on the inner peripheral surface of the rare gas pipe. Consequently, although the apparatus is simple in structure, the luminescence amount of the rare gas pipe can be finely controlled in an analog manner.

According to the second aspect of the present invention, a luminescence controlling apparatus includes a rare gas pipe in which rare gas is sealed, a pair of electrodes formed in the rare gas pipe, a power supply for impressing voltage to the pair of electrodes, an electric charge absorption member for absorbing current which flows through the pair of electrodes when voltage is impressed by the power supply, and a controller which controls whether or not the rare gas pipe emits light by switching whether or not the electric charge absorption member absorbs current.

In this luminescence controlling apparatus, by switching whether or not the electric charge absorption member absorbs the current when the rare gas pipe is discharging, the excitation energy of the fluorescent substance layer is controlled, which in turn enables an ON/OFF control of the luminescence operation.

According to the third aspect of the present invention, a luminescence apparatus includes a rare gas pipe in which rare gas is sealed, a pair of external electrodes formed on an outer peripheral surface of the rare gas pipe, and a conductive member disposed in the rare gas pipe, wherein the conductive member is capable of sending electrons out of the rare gas pipe, the electrons being generated during electric discharge of the rare gas pipe caused by impressing voltage to the pair of electrodes.

With this luminescence apparatus, the electrons generated at the time of electric discharge of the rare gas pipe is sent from the rare gas pipe since the conductive member is disposed in the rare gas pipe. Therefore, the energy amount of electrons colliding with the rare gas atoms can be adjusted by adjusting the amount of electrons sending from the rare gas pipe.

According to the fourth aspect of the present invention, a luminescence apparatus includes a rare gas pipe in which rare gas is sealed, a pair of external electrodes formed on an outer peripheral surface of the rare gas pipe and a plurality of conductive members disposed at predetermined intervals in an axial direction of the rare gas pipe so as to contact the pair of external electrodes.

With this luminescence apparatus, it is possible to switch whether or not current is absorbed at the time of electric discharge of the rare gas pipe for every plural conductive members disposed so as to contact the external pair of electrodes, which enables an ON/OFF control of the luminescence operation.

According to the fifth aspect of the present invention, an image reading apparatus for reading an original image includes a light source for irradiating the original image, wherein the light source includes a rare gas pipe in which rare gas is sealed, a pair of external electrodes formed on an outer peripheral surface of the rare gas pipe and a conductive member disposed in the rare gas pipe, the conductive member being capable of sending electrons generated during electric discharge of the rare gas pipe caused by impressing voltage to the pair of electrodes out of the rare gas pipe, and a solid image taking element which obtains image data based on incident light from the original image.

With this image reading apparatus, a variable control of the irradiation amount to the original image can be continuously performed at the time of reading the original image.

According to the sixth aspect of the present invention, an image forming apparatus includes a photosensitive member, and a light source for exposing the photosensitive member corresponding to an image data, wherein the light source includes the rare gas pipe in which rare gas is sealed, a pair of external electrodes formed on an outer peripheral surface of the rare gas pipe and a plurality of conductive members which contact the pair of external electrodes and are arranged at predetermined intervals in an axial direction of the rare gas pipe.

With this image forming apparatus, a writing to the photosensitive member can be controlled every interval of the conductive member corresponding to the image data.

Other objects and the features of the present invention will be apparent from the following detailed description of the invention with reference to the attached drawings.

BRIEF DESCRIPTION OF THE DRAWINGS

The present invention will be more fully described and better understood from the following description, taken with the appended drawings, in which.

DETAILED DESCRIPTION OF THE PREFERRED EMBODIMENTS

Figure 1:
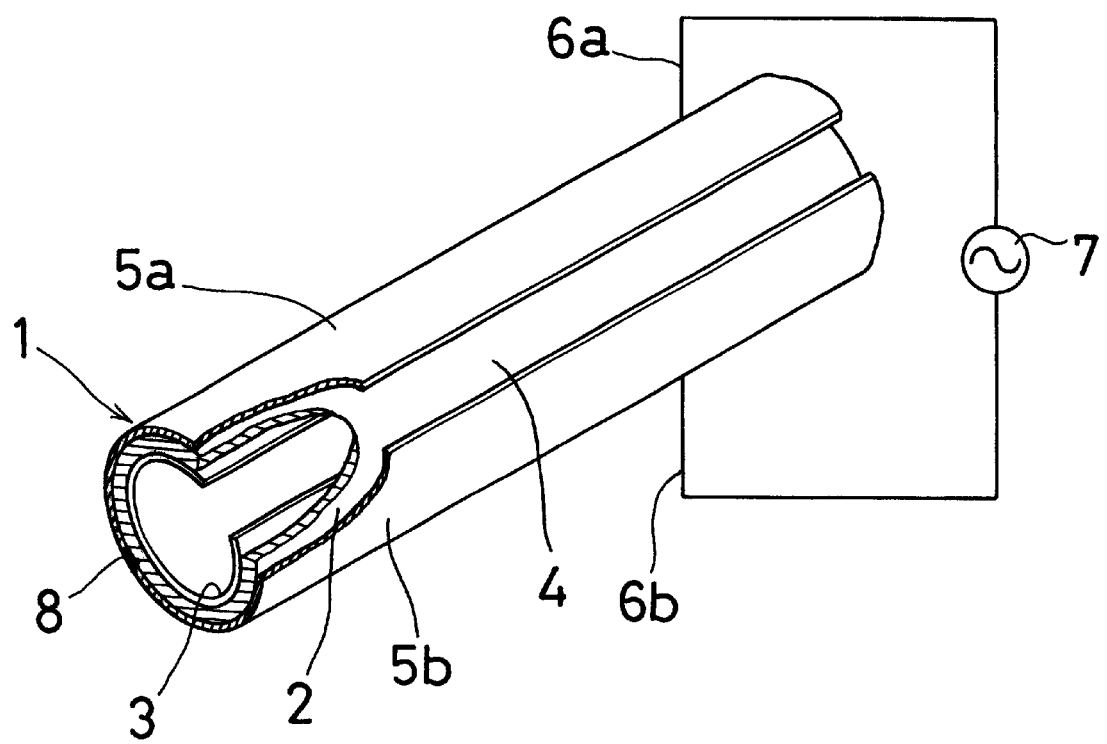
FIG. 1 is a perspective view showing a basic structure of a luminescence controlling apparatus according to an embodiment of the present invention.

FIG. 1 shows a fundamental structure of a luminescence controlling apparatus using a fluorescence lamp as a rare gas tube.

As shown in FIG. 1, the fluorescent lamp main body 2 of the fluorescent lamp 1 is a cylindrical glass valve with, for example, a diameter of about 20 mm and a length of about 240 mm. A fluorescent substance layer 3 is formed on approximately the entire inner peripheral surface of the glass valve 2 except a part of the circumference thereof, and about 80 Torr of Xenon, which is rare gas, is sealed in the glass valve 2.

The reference numeral 4 denotes an optical output portion which allow the light generated in the fluorescent lamp 1 to pass through. The optical output portion is formed at the predetermined circumference portion of the glass valve 2 by not forming a fluorescent substance layer along approximately the entire length of the axis of the glass valve 2. The width of the circumferential direction of the optical output portion 4 is set to about 4 mm.

On the outer peripheral surface of the glass valve 2 except the optical output portion 4, a pair of external electrodes 5a and 5b are provided so as to extend along approximately the entire length of the glass valve 2 with a predetermined gap in the circumferential direction. The width of the gap in the circumferential direction is about 2 mm which is narrower than the width of the aforementioned optical output portion 4. In the aforementioned gap, an insulating layer 8 for preventing a puncture between the electrodes 5a and 5b on the outer peripheral surface of the fluorescent lamp 1 is provided. Moreover, the electrodes 5a and 5b are connected to the power supply 7 for impressing an alternate voltage via leads 6a and 6b, respectively.

In the aforementioned structure, when voltage is impressed between the electrodes 5a and 5b from the power supply 7, the voltage will be supplied to the Xenon in the fluorescent lamp 1 through the glass valve 2 which is a dielectric to cause electric discharge. Ultraviolet rays generated at that time excite the fluorescent substance layer 3 to emit visible rays which are determined by the fluorescent substance layer 3 through the optical output portion 4.

The principle of luminescence will be explained in detail below.

Since electric discharge is performed through the glass valve 2 which is a dielectric, the electric discharge remains as glow discharge in which the current flow is restricted by the dielectric, and will not develop into arc discharge. Moreover, the electric discharge does not concentrate on a specific portion, but occurs at the whole portion corresponding to the electrodes 5a and 5b on the inner peripheral surface of the glass valve 2. If the thickness of the glass valve 2 or the like is constant and the characteristic as a dielectric is uniform, the current density of the inner peripheral surface of the glass valve 2 corresponding to the electrodes 5a and 5b becomes uniform. Therefore, the density of the ultraviolet rays to be generated will also become approximately uniform. As a result, the generation of the visible rays becomes approximately uniform, which in turn results in an approximately uniform luminosity distribution on the surface of the fluorescent lamp 2.

Furthermore, the current flows at the nearly zero crossing immediately after the polarity of impressed voltage is reversed. At the other timing, electric charges are accumulated on the inner peripheral surface of the glass valve 2, and the current stops flowing. In other words, a pulse current flows through the fluorescent lamp 1.

In the meantime, when the electric discharge in the glass valve is observed in detail, it is observed that a number of thin thread-like electric discharges bridging the electrodes 5a and 5b are generated at almost constant intervals, which looks like stripes as a whole. In cases where rare gas is sealed in the glass valve 2, initially, the rare gas atoms are excited to a resonance level due to the collision with electrons by the electric discharge. Since the excited atoms of the resonance level are high in rare gas pressure, the excited atoms collide with the other rare gas atoms of unexcited level to form excimer of two atomic molecules. This excimer emits ultraviolet rays to return to two rare gas atoms of unexcited level.

Since the ultraviolet rays emitted by the excimer do not cause a self-breath like atomic resonance ultraviolet rays, most of the ultraviolet rays reach the inner peripheral surface of the glass valve 2 to be converted into visible rays by the fluorescent substance layer 3. That is, in cases of light emission or luminescence by the excimer, much more bright light can be obtained. In cases where Xenon is used as rare gas, a glow discharge type lamp having electrodes therein emits large amount of xenon resonance ultraviolet rays of 147 nm, however, the fluorescent lamp 1 of the aforementioned structure emits mainly ultraviolet rays emitted by the excimer of about 170 nm. A long wavelength of ultraviolet rays is advantageous to the luminescence efficiency and the degradation of the fluorescent substance layer 3.

Figure 2:
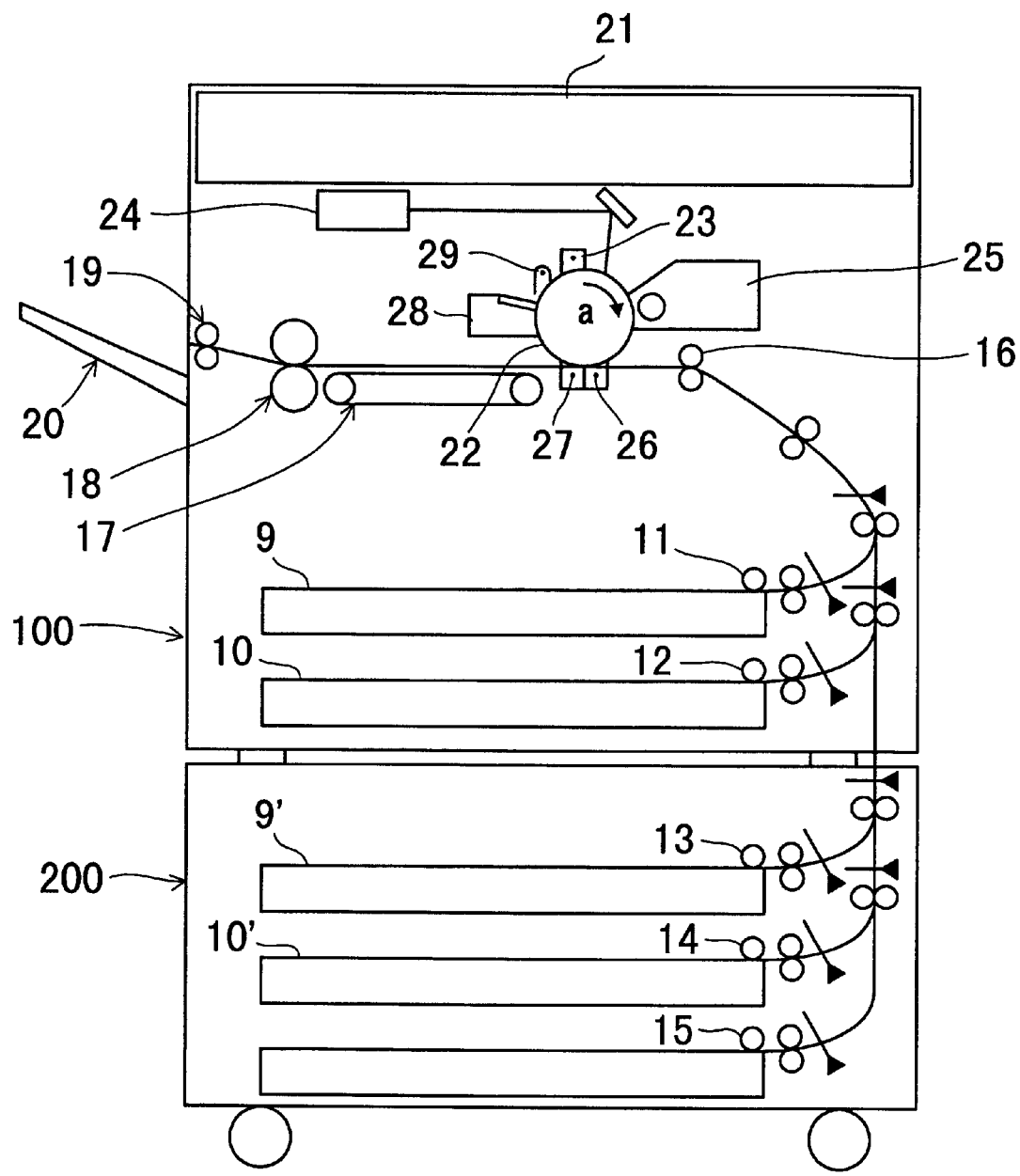
FIG. 2 is a schematic structural view showing the image forming apparatus according to the aforementioned embodiment.

FIG. 2 shows an image forming apparatus 100 according to an embodiment of the present invention.

As shown in FIG. 2, the image forming apparatus 100 is equipped with a photosensitive drum 22 at approximately the upper central portion of the apparatus. This photosensitive drum 22 is rotatable in the direction of an arrow "a". Around the photosensitive drum 22, various devices for forming an image by electronic photograph processes are provided. These devices include an electrification device 23, a laser scanning optical system 24, a developing device 25, an image transferring device 26, a paper separation device 27, a cleaning device 28 of residual toner on the photosensitive drum and an eraser lamp 29 for removing the residual electric charge.

The detailed explanation of the principle of electronic photograph is omitted since it is a well known technology. An electric signal is converted into an optical signal by the laser beam scanning optical system 24 in accordance with the image information inputted from the image scanner 21 to expose the charged photosensitive drum 22. In this way, an electrostatic latent image is formed on the photosensitive drum 22, and an image is formed on the photosensitive drum 22 by developing the electrostatic latent image by the developing device 25.

At the lower part of the image forming apparatus 100, a plurality of paper cassettes 9 and 10 are arranged. Furthermore, below the image forming apparatus 100, a paper supplying apparatus 200 is provided. The paper supplying apparatus 200 has a function which supplies a recording paper to the image forming apparatus 100 one by one.

A recording paper is selectively supplied by paper supplying rollers 11, 12, 13, 14 or 15 from the paper cassettes 9', 10' of the paper supplying apparatus 200 or the paper cassettes 9, 10 of the image forming apparatus 100, and once stopped by the timing rollers 16 and then supplied to the image transferring device 26 in synchronism with the image formed on the photosensitive drum 22. Then, the image on the photosensitive drum 22 is transferred onto the recording paper by the image transferring device 26, and the recording paper is conveyed to the fixing means 18 by the transferring belt 17 after passing through the paper separation device 27. The recording paper is discharged to the discharging tray 20 by the discharging rollers 19 after the heat fixing of the transferred toner.

Figure 3:
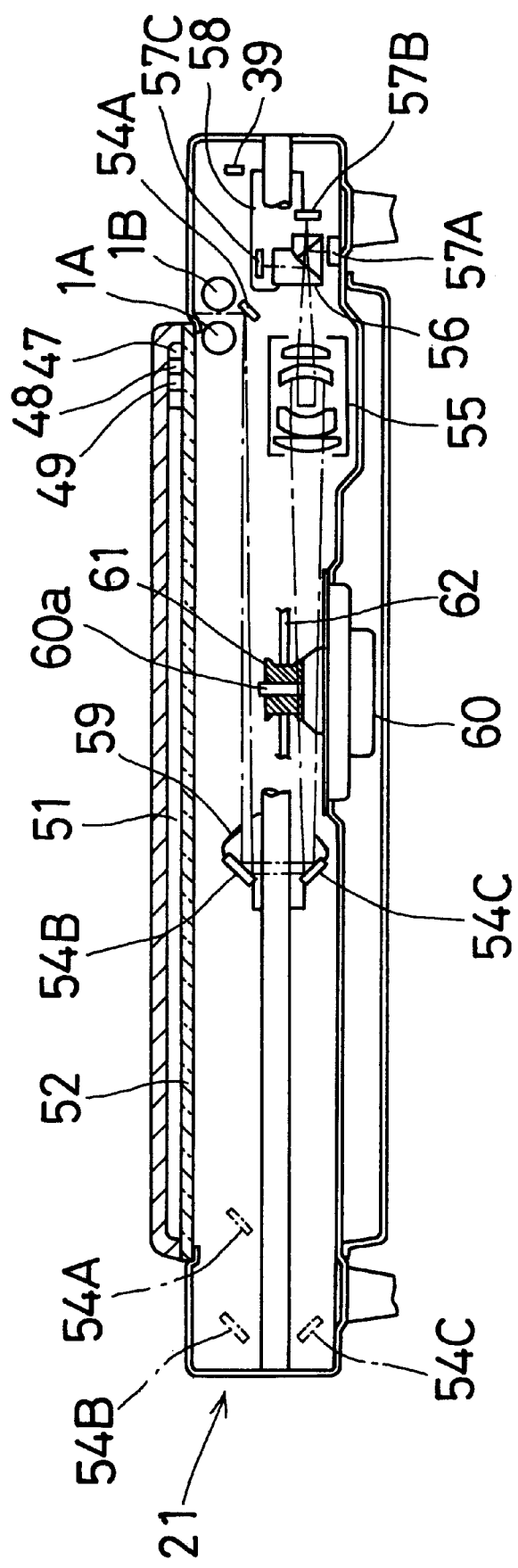
FIG. 3 is a cross-sectional view showing an image scanner of the aforementioned image forming apparatus.

FIG. 3 shows a structure of the image scanner 21 for reading the original image (manuscript image) in the image forming apparatus 100.

In FIG. 3, light is irradiated to the image of the original (manuscript) 51 placed on the platen (contact glass) 52 by the fluorescent lamps 1 (1A, 1B) as a light source for lighting the original. The reflected light from the image is reflected by the first movable mirror 54A, the second movable mirror 54B and the third movable mirror 54C to reach the dichroic prism 56 via the focusing lenses 55, and then split there. The split lights are inputted into the CCDs 57A, 57B and 57C which are solid image taking elements.

Disposed outside the original placing region of the aforementioned platen 2 are a white reference plate 47 for performing a shading correction and for grasping a change of the spectral distribution of the fluorescent lamps 1A and 1B, a black reference plate 48 for performing a dark current correction of the CCDs 57A, 57B and 57C, and a reference plate 49 which reflects a specific color (specific wavelength) used for grasping the spectral distribution change of the fluorescent lamps 1A and 1B.

The fluorescent lamps 1A and 1B and the first mirror 54A are provided at a first carriage 58, and the second mirror 54B and the third mirror 54C are provided at a second carriage 59. Furthermore, the second carriage 59 moves at the rate of one half of the first carriage 58 to keep the optical length from the original 51 to the CCDs 57A, 57B and 57C constant. The first and second carriages 58 and 59 scan from the right to the left when reading the original image.

The reference numeral 60 denotes a carriage driving motor, and a pulley 61 is fixed to the rotation axis 60a of the carriage driving motor 60. Around the pulley 61, a carriage driving wire 62 is wound, and the first carriage 58 is connected to the carriage driving wire 62. Furthermore, the carriage driving wire 62 is also wound around the running block (not shown) on the second carriage 59.

In accordance with the forward and reverse rotations of the aforementioned carriage driving motor 60, the first carriage 58 and the second carriage 59 move forwards (original reading scan) and moves backwards (return), and the second carriage 59 travels at the rate of one half of the first carriages 58. When the first carriage 58 is in its home position, the first carriage 58 is detected by a home position sensor 39 of a reflected type photosensor. When the first carriage 58 drives leftwards to go away from the home position during the exposure scanning, the sensor 39 does not receive light (carriage non-detection status).

When the first carriage 58 returns to the home position, the sensor 39 receives light (carriage detection status), and when it changes to the light receiving status from the non-light receiving status, the first carriage 58 stops. The lighting fluorescent lamps 1A and 1B are turned on during the forward movement (original reading scan) and rearward movement (return).

Figure 4:
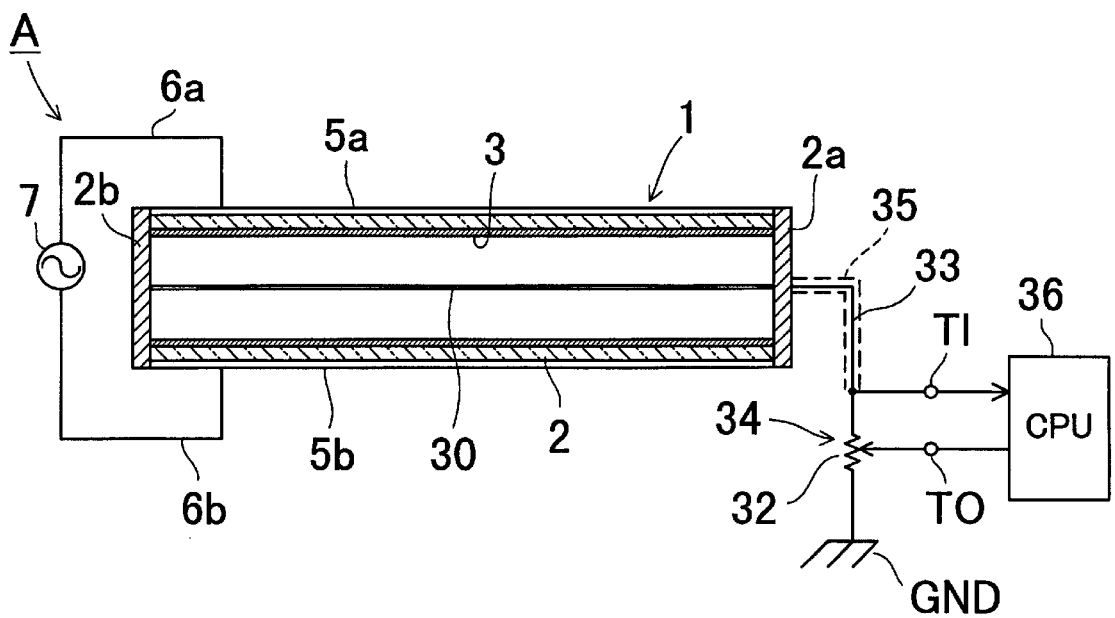
FIG. 4 is a structural view showing a luminescence controlling apparatus according to the aforementioned embodiment.

FIG. 4 shows a structure of a luminescence controlling apparatus according to an embodiment of the present invention.

In FIG. 4, the luminescence controlling apparatus A is applied to the image scanner 21 in the aforementioned image forming apparatus 100, and is equipped with a fluorescent lamp 1 as a rare gas tube, an electric charge absorption member 30 disposed in the fluorescent lamp 1 (in the rare gas), a luminescence control means 34 for controlling the luminescence amount of the fluorescent lamp 1, and a power supply 7 for impressing an alternate voltage to the electrodes 5a and 5b (see FIG. 1).

The fluorescent lamp 1 is equipped with a cylindrical valve 2 which is a lamp main body whose opposite end openings are closed by sealing side plates 2a and 2b, and a fluorescent substance layer 3 formed on almost the whole inner peripheral surface of the glass valve 2 except a part of the circumferential direction thereof. Furthermore, the fluorescent lamp 1 is equipped with a plurality of pairs of electrodes 5a and 5b disposed on the outer peripheral surface of the glass valve 2 in the length direction of the glass valve 2. The portion where the fluorescent substance layer 3 is not formed on the inner peripheral surface of the glass valve 2 constitutes an optical output portion 4 (see FIG. 1).

Since other basic structures are the same as those shown in FIG. 1, the explanation will be omitted.

The electric charge absorption member 30 is provided so as to absorb the electric charge generated at the time of electric discharge of the fluorescent lamp 1, and is comprised of an aluminum grid line with a diameter of about 2 mm extending from one end of the axial direction of the glass valve 2 to the other end thereof. Both ends of the grid line 30 are supported by the sealing side plates 2a and 2b, respectively, and one end thereof is extended out of one of the sealing side plates 2a and electrically connected to an external lead 33.

The luminescence control unit 34 has the external lead 33 connected to one end of the grid line 30, the variable resistor 32 arranged between the external lead 33 and the grand GND, and a CPU 36 for controlling the variable resistor 32. By changing the resistance of the variable resistor 32 by the CPU 36, the amount of current flowing through the grid line 30 can be changed.

Between the end of the grid line 30 and the variable resistor 32, an analog input terminal TI which sends a signal corresponding to the amount of current which flows through the variable resistor 32 to the CPU 36 is connected electrically. Furthermore, an analog output terminal TO to which a control signal for driving the variable resistor is impressed from the CPU 36 is electrically connected to the movable contact of the variable resistor 32. The reference numeral 35 is an insulating cover for covering the external lead 34.

In the aforementioned structure, when an alternate voltage is impressed to the electrodes 5a and 5b from the power supply 7, the fluorescent lamp 1 will repeat the lighting operation as explained in FIG. 1. When the resistance of the aforementioned variable resistor 32 is changed by impressing the control signal from the CPU 36 to the analog output terminal TO, the amount of current which flows through the variable resistor 32 is converted into voltage, and the converted voltage is detected. Controlling the voltage value detection and the resistance of the variable resistor 32 by the CPU 36 enables a control of luminescence amount, i.e., a luminescence control of the fluorescent lamp 1.

Figure 6:
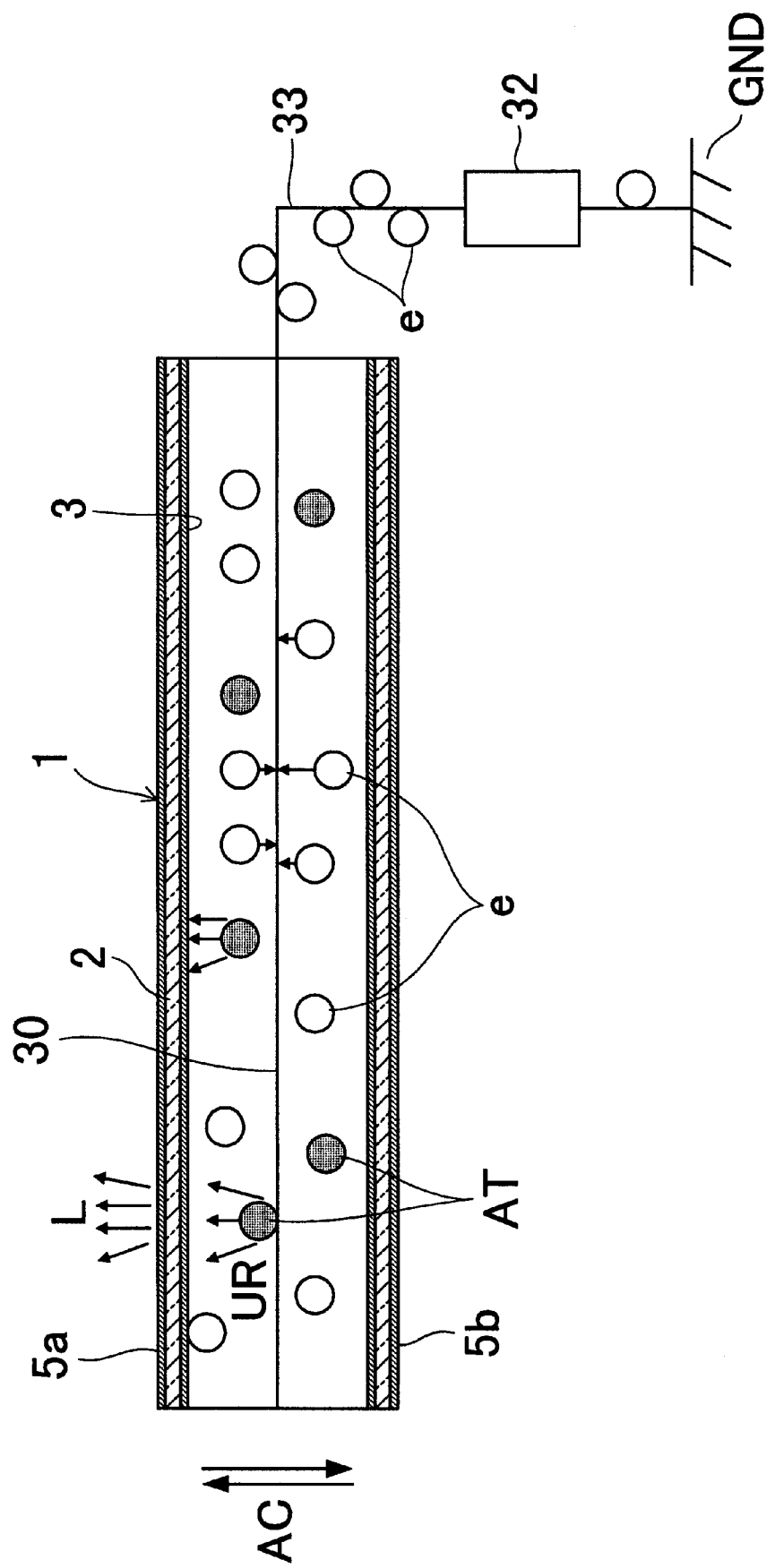
FIG. 6 is a schematic cross-sectional view showing an operation of the aforementioned luminescence controlling apparatus.

Concretely, first, electric discharge occurs as explained in the luminescence principle. In other words, as shown in FIG. 6, electric discharge occurs in the fluorescent lamp 1 by impressing an alternate voltage AC to the electrodes 5a and 5b. Due to the electric discharge, Xe atoms AT and electrons e collide with each other, which generates ultraviolet rays UR. The ultraviolet rays UR are irradiated to the fluorescent substance layer 3 to excite the fluorescence molecules, which in turn generates visible rays L from the fluorescent substance layer 3.

Figure 7:
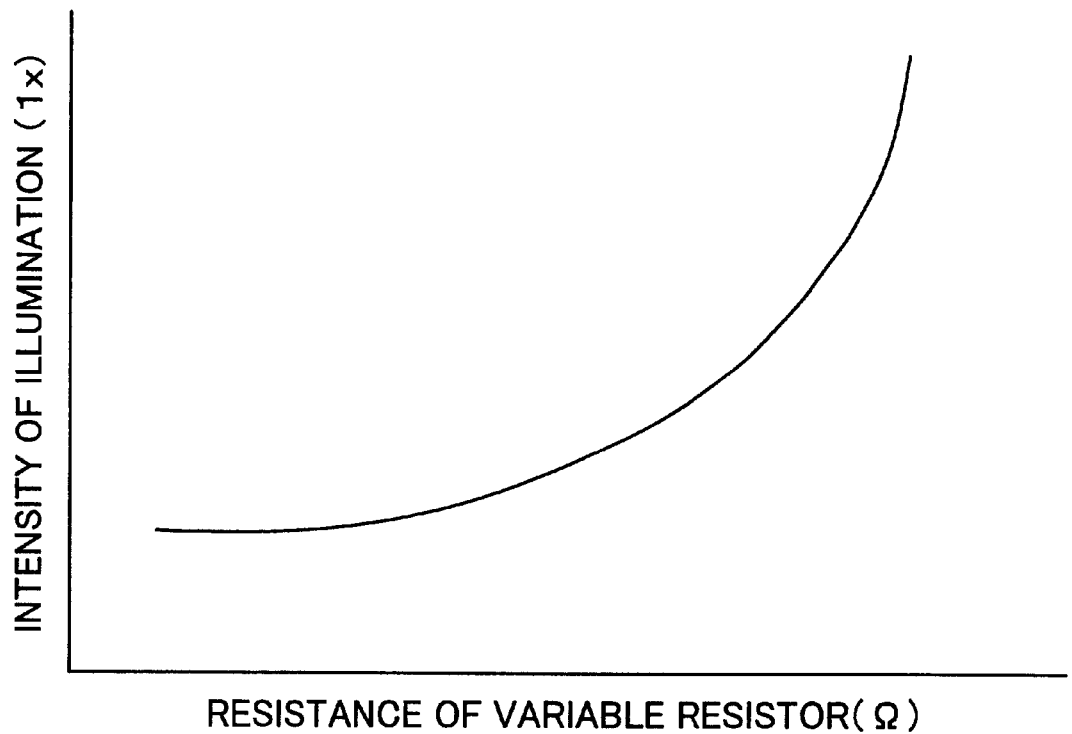
FIG. 7 is a characteristic graph showing a relation between a resistance of a variable resistor and illumination at the time of emitting light.

The absorption amount of the electrons e, i.e., the quantity of atoms e which collide with the Xe atoms AT, at the time of the electric discharge is changed by the resistance of the variable resistor 32. For example, by decreasing the resistance, the luminescence amount of the fluorescent lamp 1 decreases. To the contrary, by increasing the resistance, the luminescence amount increases (see FIG. 7). This is because electrons easily flow when the resistance is small and hardly flow when the resistance is large.

By changing the resistance of the variable resistor 32 when electrons collide with Xe atoms AT, the quantity of electrons e to be absorbed by the grid line 30 is changed, which adjusts the quantity of electrons colliding with Xe atoms AT. At that time, a voltage is calculated by integrating the value of the current passing through the grid line 30 with the resistance of the variable resistor. Since the current flowing through the grid line 30 is about 3 $\mu A$ and the resistance of the variable resistor is 1 M$\Omega$, voltage not more than 3 V occurs. By detecting the voltage value by the CPU 36, the resistance of the variable resistor 32 can be variably controlled.

In the meantime, the CPU 36 controls the variable resistor 32 so that the variable resistor synchronizes with the cycle changes of the alternate voltage of the power supply 7.

Figure 5:
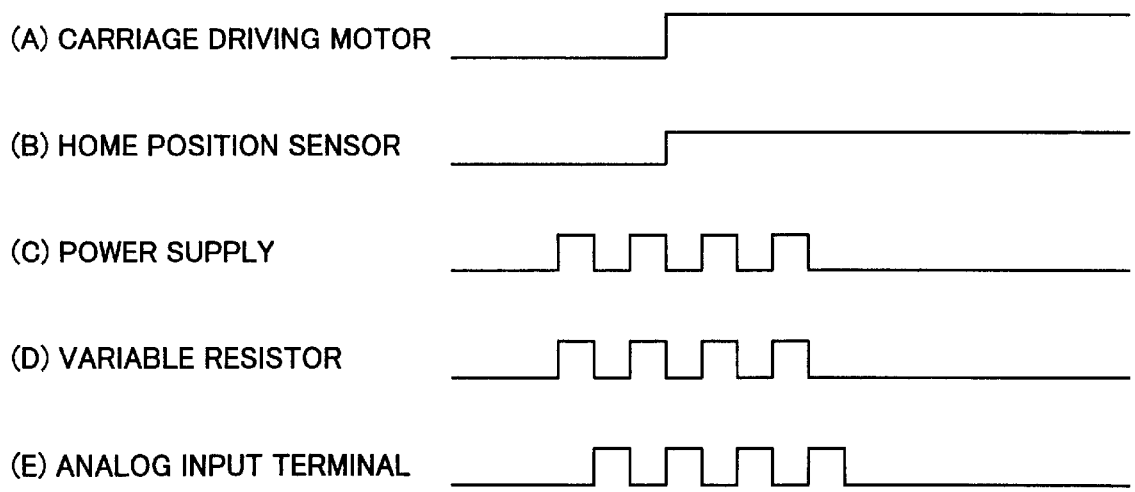
FIG. 5 is a timing chart for the sequence operations of the fluorescence lamp of the aforementioned luminescence controlling apparatus.

FIG. 5 is a timing chart of the sequence operation of the fluorescent lamp 1 (1A, 1B) for irradiating the original (manuscript) at the time of operation of the image scanner 21.

When the print button (not shown) of the image forming apparatus 100 is depressed, as shown in FIGS. 5(D) and (E), the resistance of the variable resistor 32 is changed in synchronism with the input of the power supply shown in FIG. 5(c) (by which a PWM control is performed) inputted into the fluorescent lamp 1. The changed value of the resistance is converted into a voltage value, and then outputted to the analog input terminal TI.

Thereafter, the carriage driving motor 60 is operated in order to detect the home position as shown in FIGS. 5(A) and (B). Then, after the detection of the home position, the scanning operation is repeated depending on the number of the originals.

With such an simple structure in which an electric charge absorption member 30 like a grid line is disposed in the fluorescent lamp 1, some electrons generated when the fluorescent lamp 1 is discharging are absorbed by the aforementioned electric charge absorption member 30, enabling an adjustment of the amount of energy generated by colliding electrons with Xe atoms, which in turn enables a control of the excitation energy of the fluorescent substance layer 3. Therefore, although it is simple in structure, the luminescence amount can be finely controlled in an analog manner.

The grid line 30 is not limited to the straight member as mentioned above, and may be a mesh-shaped member, a bunch of plural wires or a spiral wire. Especially, using a spiral wire is advantageous in that electric charge can be absorbed uniformly.

Moreover, the material of the grid line 30 is not limited to aluminum, but may be conductive materials such as copper or alloy which can absorb electrons.

Figure 8:
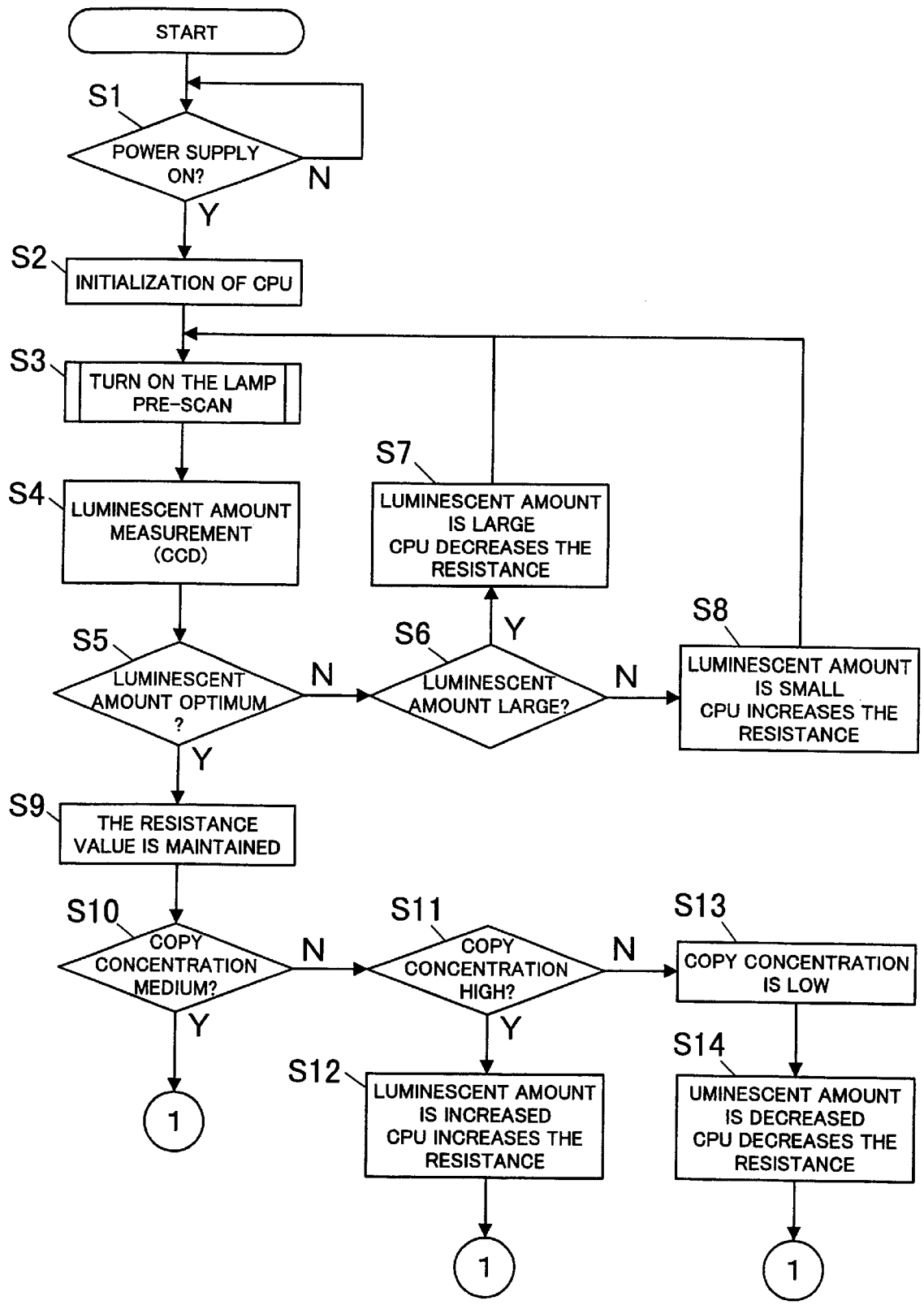
FIG. 8 is a flow chart showing the operation of the aforementioned luminescence controlling apparatus.

FIG. 8 is a flow chart which shows a luminescence control operation by the aforementioned luminescence controlling apparatus A.

In the following explanation and drawings, a step is abbreviated as "S". Moreover, in the drawings, YES and NO are abbreviated as "Y" and "N", respectively.

First, in S1, it is judged whether or not the power supply 7 is turned on. If it is turned on (YES in S1), the CPU 36 is initialized in S2. If the power supply 7 is turned off (NO in S1), the routine waits until the power supply 7 is turned on.

Subsequently, in S3, the image of the original (manuscript) 51 is scanned (pre-scanned) by the image scanner 21 with the fluorescent lamp 1 turned on. By performing this, in S4, the luminescence amount of the fluorescent lamp 1 is measured through the CCDs 57a–57c. This luminescence amount uses the last luminescence amount as it is. Therefore, the luminescence amount of the fluorescent lamp 1 is adjusted each time.

In S5, it is judged whether or not the measured luminescence amount is optimum. When the luminescence amount is not optimum (NO in S5), it is judged whether or not the luminescence amount exceeds a predetermined value in S6. When the luminescence amount exceeds the predetermined value (YES in S6), in S7, the resistance of the variable resistor 32 is decreased based on the instructions from the CPU 36 to reduce the luminescence amount.

Moreover, when the luminescence amount does not exceed the predetermined value (NO in S6), in S8, the resistance of the variable resistor 32 is increased based on the instructions from the CPU 36 to increase the luminescence amount. After performing these luminescence amount adjustment processing, the fluorescent lamp 1 is made to emit light again in S3, and the adjustment processing is repeated until the luminescence amount becomes optimum. When the luminescence amount is proper or optimum (YES in S5), in S9, the variable resistance value at the time of this proper luminescence amount is memorized and held.

Next, when copying, a user selects the copy concentration. In S10, it is judged whether or not the copy concentration is medium. When the copy concentration is not medium (NO in S10), in S11, it is judged whether or not the copy concentration is high. When the copy concentration is not high (NO in S11), in S13, it is judged whether or not the copy concentration is low.

If the copy mode is set to AUTO, the copy concentration is set to medium, and the routine proceeds to S15. When the copy concentration is high (YES in S11), in S12, the CPU 36 adjusts the variable resistor 32 so as to increase the resistance in order to increase the luminescence amount of the fluorescent lamp 1. Then, the routine proceeds to S15. Moreover, when the copy concentration is low, in S14, the CPU 36 adjusts the variable resistor 32 so as to decrease the resistance in order to decrease the luminescence amount of the fluorescent lamp 1. Then, the routine proceeds to S15. The increased and/or decreased amount of the resistance is calculated on the basis of the initially determined resistance value.

Figure 9:
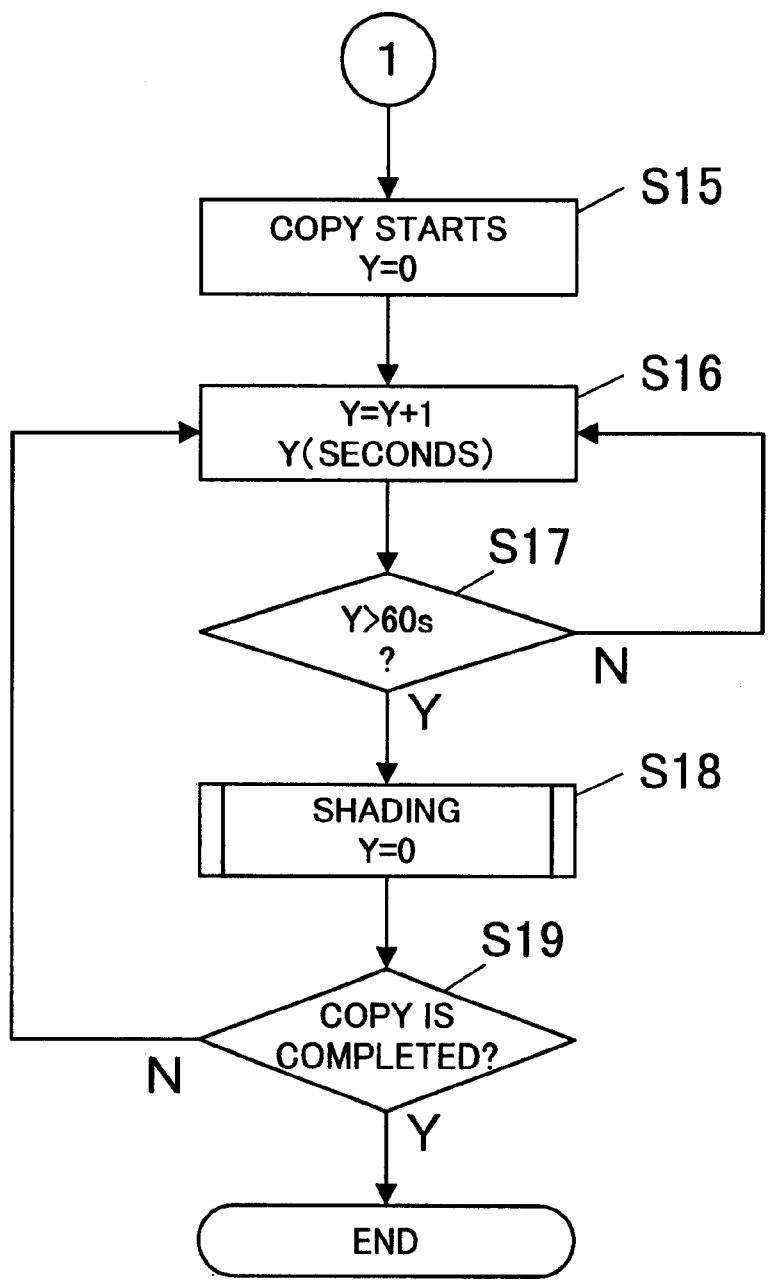
FIG. 9 is a flow chart showing the processes after the copy concentration is determined.

FIG. 9 is a flow chart showing the operation after the copy concentration is determined.

After the copy concentration is determined, in S15, a copying operation starts and a time measurement starts. This time is measured during the copying operation. In S16, when a predetermined time passes, the measured value is incremented by "1."

Subsequently, it is judged whether or not the measured value exceeded 60 seconds in S17. The time measurement is continued when it does not exceed 60 seconds (NO in S17). When it exceeds 60 seconds (YES in S17), in S18, a shading is performed in order to adjust the luminescence amount of the lamp. At that time, the measured time value is returned to "0". In S19, it is judged whether or not the copying operation is completed. If the copying operation is completed (YES in S19), the routine terminates. When the copying operation is not completed (No in S19), the routine returns to S16 to continue the time measurement until the copying operation is completed.

Figure 10:
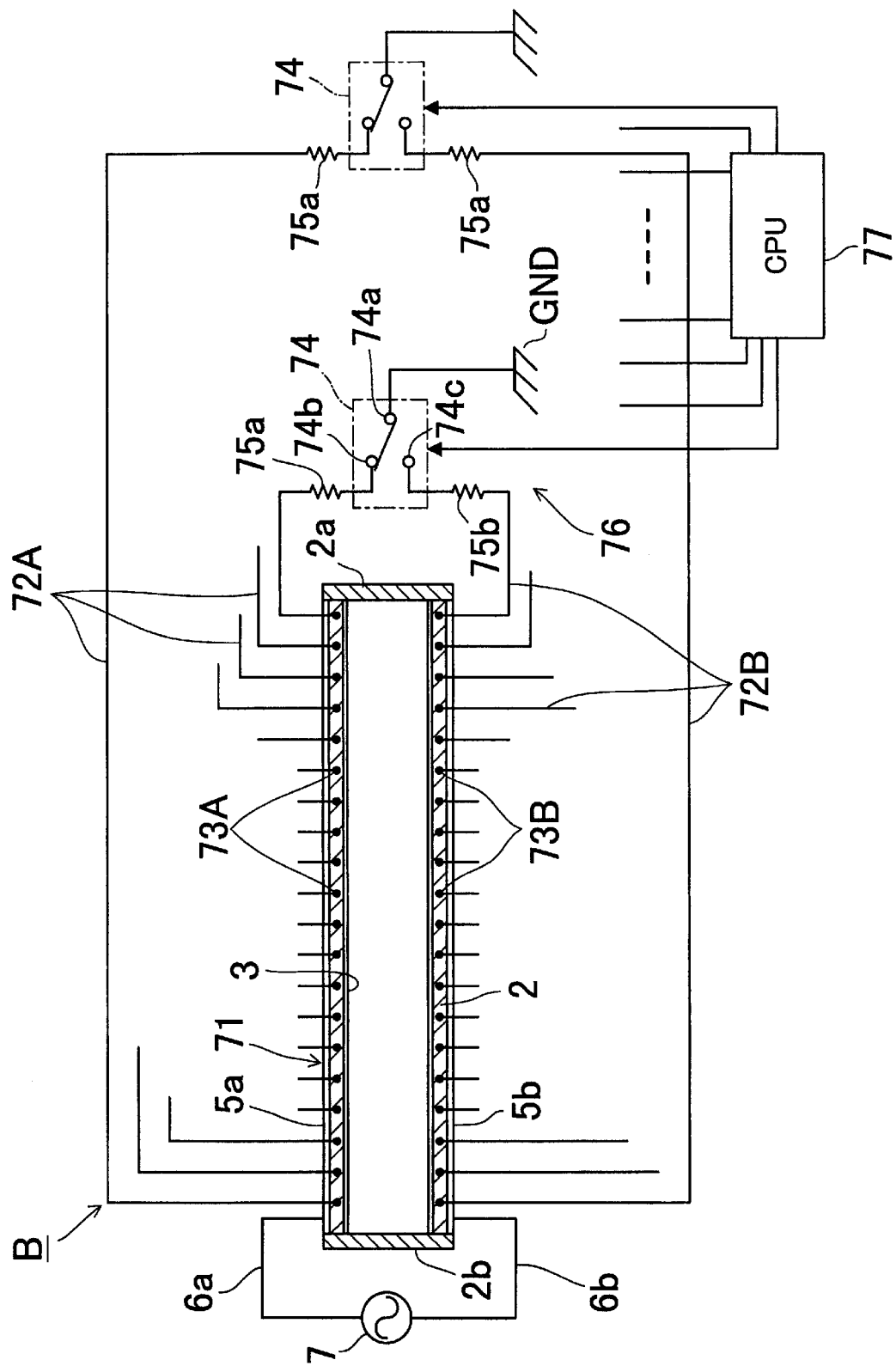
FIG. 10 is a structural view showing a luminescence controlling apparatus according to another embodiment of the present invention.

FIG. 10 shows a luminescence controlling apparatus B according to another embodiment of the present invention.

In FIG. 10, the same reference is given to the same part as in the luminescence controlling apparatus A shown in FIG. 4, and the explanation will be omitted.

This luminescence controlling apparatus B is equipped with a fluorescent lamp 71 which has one electric charge absorption member or 2 sets of electric charge absorption members 73 (73A, 73B) corresponding to the aforementioned electrodes 5a and 5b, respectively, as illustrated here and a luminescence control unit 76 which controls whether or not the lamp 1 emits light by controlling the electric charge absorption by the electric charge absorption member 73.

The electric charge absorption members 73A and 73B of each set comprise a plurality of dot-like aluminum pieces (hereinafter may be referred to as "dot-like elements"). They are arranged at every constant pitch (dot pitch) in the axial direction of the glass valve 2 of the fluorescent lamp 71 in a state that they are completely or half embedded in the peripheral wall of the glass valve 2.

The aforementioned luminescence control unit 76 is provided with a plurality of control lines 72 (72A, 72B) each connected to electric charge absorption members 73A and 73B, a plurality of changing switches each disposed between each electric charge absorption member 73A, 73B and the ground GND, resistors 75a and 75b each disposed between the electric charge absorption members 73A and 73B and each changing switch 74, and a CPU 77.

Each exchanging switch 74 is comprised of a movable contact 74a connected to the ground GND, a first fixed contact 74b electrically connected to one electrode absorbent 73A through the resistor 75a and a second fixed contact 74c electrically connected to another electrode absorbent 73B through the resistor 75b. The driving of the movable contact 74a is controlled by the CPU 77.

When dots of an image is, for example, 200 dpi, in the axial full length (210 mm) of the fluorescent lamp 1, each one end of, for example, 1654 control lines 72A and 72B is electrically connected to each dot-like element 73A, 73B, and each other end thereof is electrically connected to the resistors 75a or 75b. With this structure, whether or not the fluorescent lamp 1 emits light is controlled per an image dot pitch unit corresponding to the number of control lines.

In the aforementioned structure, in order to emit light from the part corresponding to the dot element 73 of the fluorescent lamp 71, when the positive half cycle of the alternate voltage of the power supply 7 is impressed to the electrode 5a, the terminal 74a of the exchanging switch 74 is switched to the contact 74c side (control line 72B side), and when the positive half cycle of the alternate voltage of the power supply 7 is impressed to the electrode 5b, the terminal 74a of the exchanging switch 74 is switched to the contact 74b side (control line 72A side). As a result, the fluorescent lamp 71 discharges to emit light.

On the other hand, when the positive half cycle of the alternate voltage of the power supply 7 is impressed to the electrode 5a, the movable contact 74a of the exchanging switch 74 is switched to the contact 74b side (control line 72A side). When the positive half cycle of the alternate voltage of the power supply 7 is impressed to the electrode 5b, the terminal 74a of the exchanging switch 74 is switched to the contact 74c side (control line 72B side). As a result, the electric charge for electric discharge is absorbed by the dot elements 73A and 73B. The current of these dot elements 73A and 73B begins to flow to the grand GND through the resistors 75a or 75b via the changing switch 74. This stops the electric discharge of the fluorescence lamp 71. That is, the excitation energy of the fluorescent substance layer 3 is absorbed by the dot elements 73A or 73B, and the luminescence operation is controlled at the portions of these dot elements 73A and 73B.

In the meantime, if the high voltage generated when the large current flows through the aforementioned resistors 75a or 75b is directly grounded to the ground GND, the power supply 7 will be damaged. For this reason, the aforementioned resistors 75a and 75b perform current restrictions in order to prevent the damage of the power supply 7.

As mentioned above, by switching the contact 74a of the exchanging switch 74 to each dot element 73A, 73B, the luminescence operation and non-luminescence operation of the fluorescent lamp 71 can be controlled for every dot pitch (the number of lines).

Figure 11:
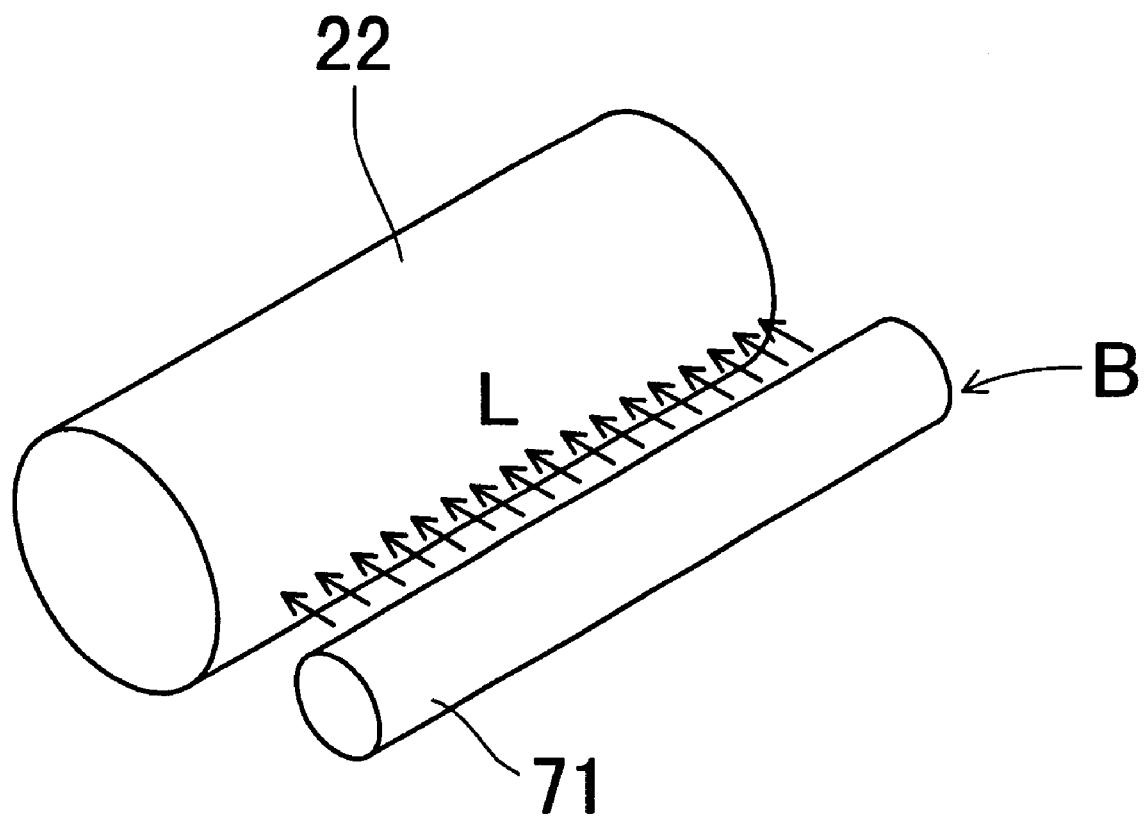
FIG. 11 is a schematic perspective view showing the luminescence controlling apparatus as a writing means arranged in parallel with a photosensitive member.

Thus, the fluorescent lamp 71 controlled as mentioned above can be arranged in parallel with the photosensitive drum 22 as, for example, a print head for exposing the photosensitive drum 22 in the aforementioned image forming apparatus 100, as shown in FIG. 11.

Figure 12:
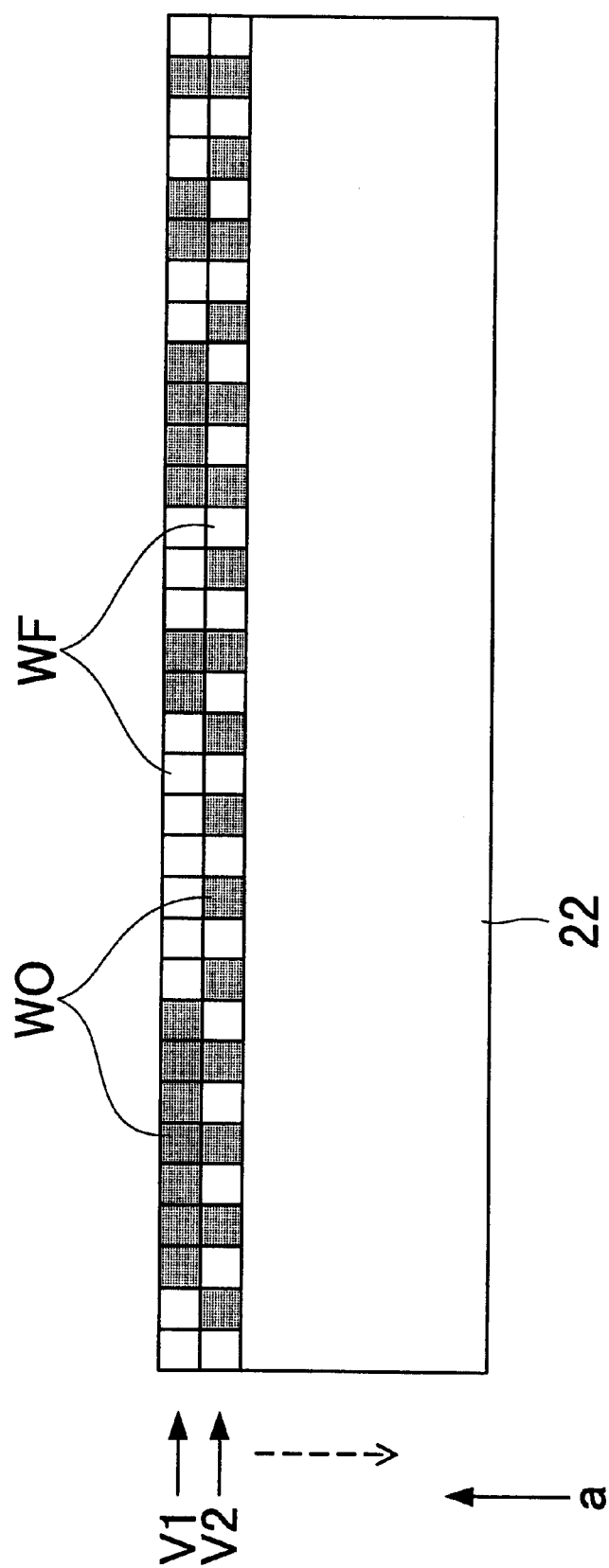
FIG. 12 is an explanatory view showing a write-in operation by the aforementioned luminescence controlling apparatus.

By performing the ON/OFF control of the electric charge absorption operation of the aforementioned dot elements 73 through the control lines 72 by the CPU 77, the image by the luminescence dot WO and the non-luminescence dot WF can be written every image line V1, V2 . . . in accordance with the rotation of the photosensitive drum 22 (in the direction of an arrow "a"), as shown in FIG. 12.

In the meantime, the number of the dot elements 73 as an electric charge absorption member may be arbitrarily set. When the number of the dot element 73 is small, the writing operation may be performed by moving the fluorescent lamp 71 in the axial direction relative to the photosensitive drum 22.

Figure 13:
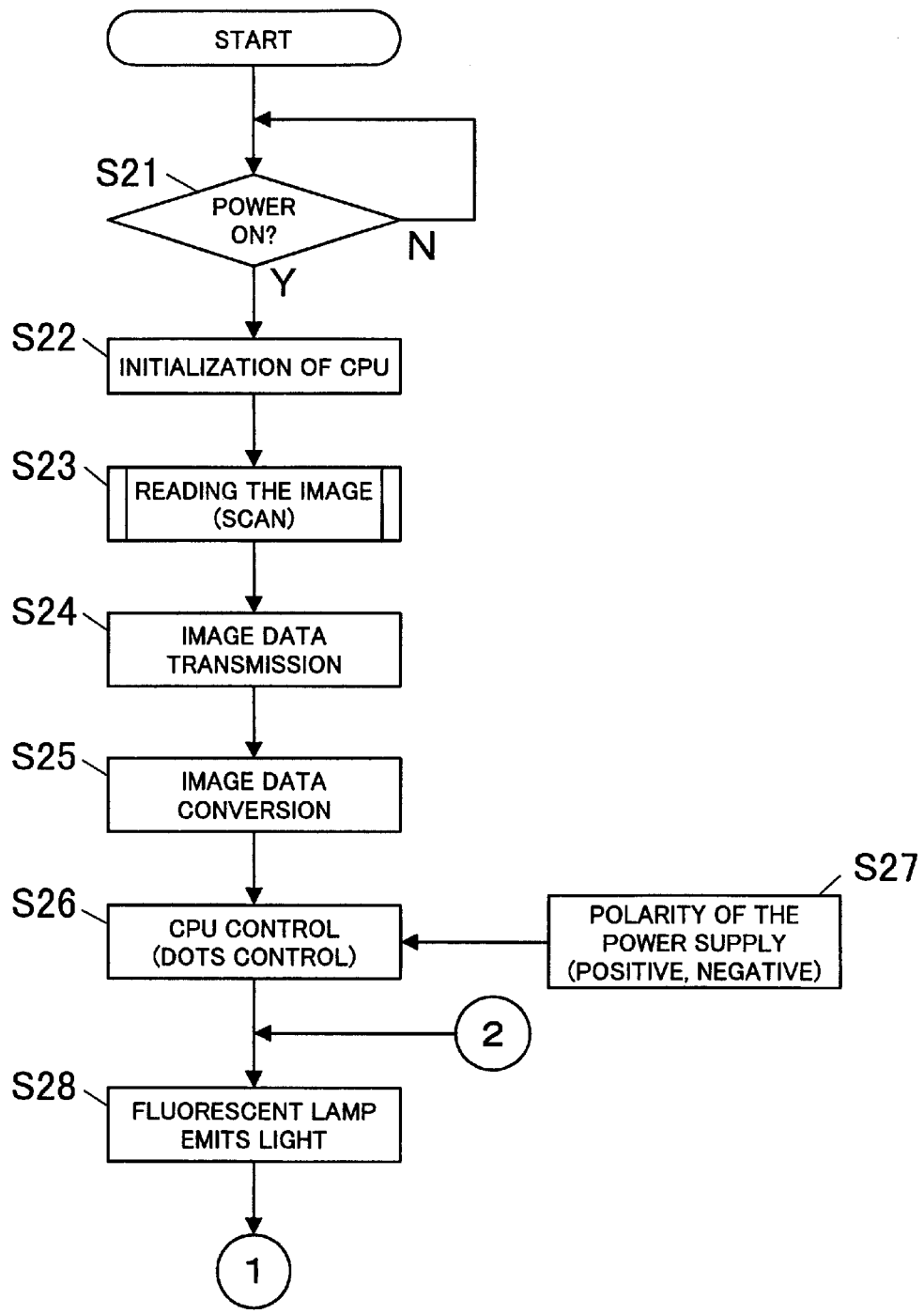
FIG. 13 is a flow chart showing the operation of the luminescence controlling apparatus.

FIG. 13 is a flow chart showing an operation when the aforementioned luminescence controlling apparatus B is used for a print head.

First, in S21, it is judged whether or not the power supply 7 is turned on. When the power supply 7 is turned on (YES in S21), the CPU 77 is initialized in S22. When it is turned off (NO in S21), the routine waits until the power supply 7 is turned on.

Subsequently, in S23, the fluorescent lamp 1 is made to emit light and the image of the original 51 is scanned by the image scanner 21. In S24, this read image is transmitted as data from the scanner 52. In S25, data conversion and compression are performed so that the ON/OFF information in every dot may be added to the image of one line to this transmitted image data.

In S26, a control signal is sent out to the print head from the CPU 77 so that the data is written in the photosensitive drum 22 for every line. Since the ON/OFF control for every image one dot is needed at that time, in S27, the electric discharge direction of the fluorescent lamp 71 is sent into the CPU 77 as information from the power supply 7 side. This is because the power supply 7 is short-circuited to cause a damage of the apparatus if the electric discharge direction (+, −) and the direction for dropping electrons into the ground GND are reversed.

In S28, when the information on the image data of one line is processed by the CPU 77, the fluorescent lamp 71 is made to emit light, and then the written data processed for every dot is sent out to the print head from the CPU 77.

Figure 14:
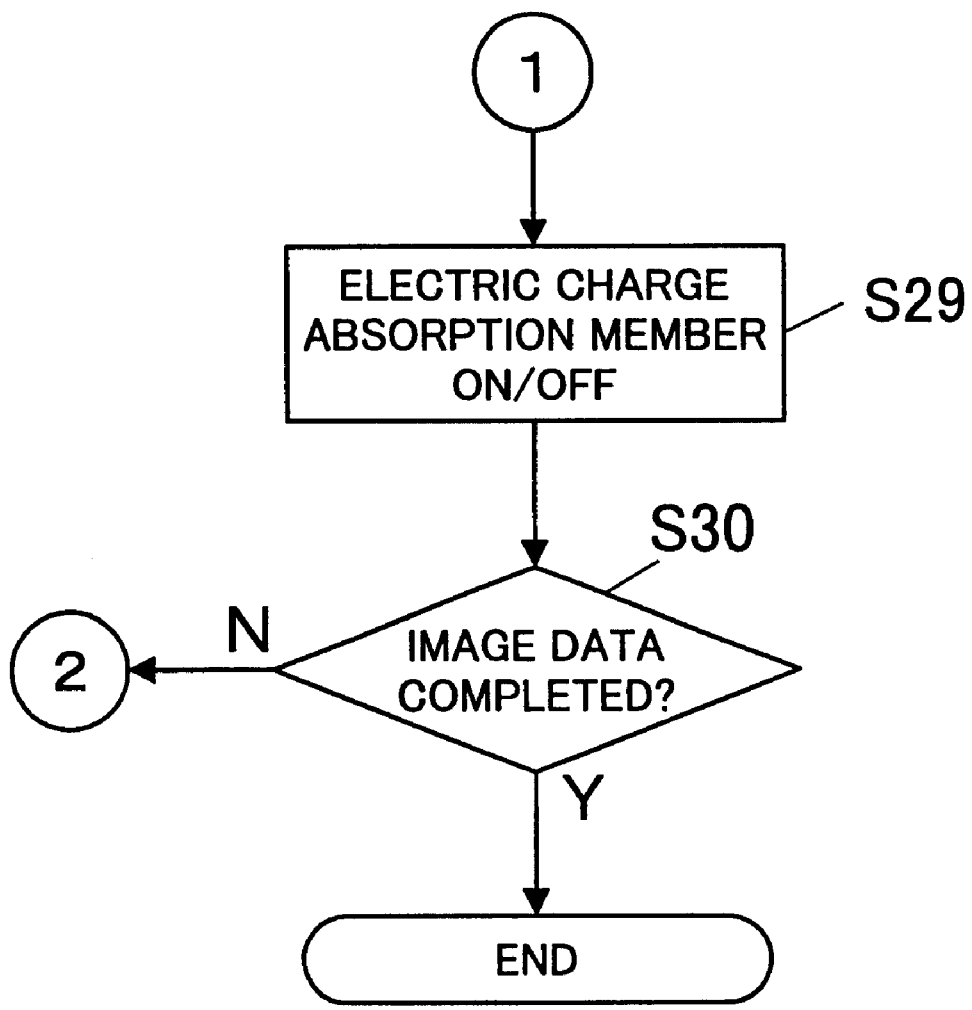
FIG. 14 is a flow chart showing the processes after the luminescence of the fluorescence lamp.

FIG. 14 is a flow chart showing a processing after sending out the aforementioned written data to the print head.

In S29, when the written data is sent out to the print head from the CPU 77, the resistance for the electric charge absorption of the electric charge absorption member (dot element) 73 which is an electric charge absorber is changed, and a writing in the photosensitive drum 22 is performed every line (one Figdot control). Subsequently, in S30, it is judged whether or not a sending of the image data by the CPU 77 is completed. When the sending of the image data is completed (YES in S30), the routine terminates. When the sending of the image data is not completed (NO in $S^3$0), the routine returns to S28 (luminescence of the fluorescent lamp 71).

The terms and expressions which have been employed herein are used terms of description and not of limitation, and there is no intent, in the use of such terms and expressions, of excluding any of the equivalents of the features shown and described or portions thereof, but it is recognized that various modifications are possible within the scope of the invention claimed.

What is claimed is:

1. A luminescence controlling apparatus, comprising:
   a rare gas pipe in which rare gas is sealed, said rare gas pipe being equipped with a pair of electrodes;
   a power supply for impressing voltage to said pair of electrodes;
   an electric charge absorption member disposed in said rare gas pipe to absorb electrons generated during electric discharge of said rare gas pipe caused by impressing voltage to said pair of electrodes; and
   a controller for controlling a luminescence amount of said rare gas pipe by adjusting a quantity of said electrons absorbed by said electric charge absorption member.

2. The luminescence controlling apparatus as recited in claim 1, wherein said pair of electrodes is an external pair of electrodes formed at an exterior of said rare gas pipe.

3. The luminescence controlling apparatus as recited in claim 1, wherein said electric charge absorption member is a wire-like conductive member extending from one end of said rare gas pipe to the other end thereof.

4. The luminescence controlling apparatus as recited in claim 3, wherein said wire-like conductive member is made of spirally twisted wires.

5. A luminescence controlling apparatus, comprising:
   a rare gas pipe in which rare gas is sealed;
   a pair of electrodes formed in said rare gas pipe;
   a power supply for impressing voltage to said pair of electrodes;
   an electric charge absorption member for absorbing current which flows through said pair of electrodes when voltage is impressed by said power supply; and
   a controller which controls whether or not said rare gas pipe is made to emit light by switching whether or not said electric charge absorption member absorbs current.

6. The luminescence controlling apparatus as recited in claim 5, wherein said electric charge absorption member includes a plurality of members disposed at predetermined intervals in an axial direction of said rare gas pipe.

7. A luminescence apparatus, comprising:

a rare gas pipe in which rare gas is sealed;

a pair of external electrodes formed on an outer peripheral surface of said rare gas pipe; and a conductive member disposed in said rare gas pipe, wherein said conductive member is capable of sending electrons out of said rare gas pipe, said electrons being generated during electric discharge of said rare gas pipe caused by impressing voltage to said pair of electrodes.

8. The luminescence apparatus as recited in claim 7, wherein said conductive member is grounded via a variable resistor provided outside said rare gas pipe.

9. The luminescence apparatus as recited in claim 7, further comprising a controller which controls a luminescence amount of said rare gas pipe by adjusting a quantity of electrons sending from said conductive member.

10. The luminescence apparatus as recited in claim 9, wherein said conductive member is grounded via said variable resistor provided outside said rare gas pipe, and wherein said controller controls a luminescence amount of said rare gas pipe by controlling a resistance of said variable resistor.

11. The luminescence apparatus as recited in claim 7, wherein said conductive member is a wire-like conductive member extending from one end of said rare gas pipe to the other end thereof.

12. The luminescence apparatus as recited in claim 11, wherein said wire-like conductive member is made of spirally twisted wires.

13. A luminescence apparatus, comprising:

a rare gas pipe in which rare gas is sealed;

a pair of external electrodes formed on an outer peripheral surface of said rare gas pipe; and a plurality of conductive members disposed at predetermined intervals in an axial direction of said rare gas pipe so as to contact said pair of external electrodes.

14. The luminescence apparatus as recited in claim 13, further comprising:

a switch for switching whether or not said conductive member is grounded; and a controller for controlling whether or not said rare gas pipe is made to emit light by switching said switch.

15. An image reading apparatus for reading an original image, comprising:

a light source for irradiating said original image, wherein said light source includes a rare gas pipe in which rare gas is sealed, a pair of external electrodes formed on an outer peripheral surface of said rare gas pipe and a conductive member disposed in said rare gas pipe, said conductive member being capable of sending electrons generated during electric discharge of said rare gas pipe caused by impressing voltage to said pair of electrodes out of said rare gas pipe; and a solid image taking element which obtains image data based on incident light from said original image.

16. The image reading apparatus as recited in claim 15, further comprising a controller for controlling a luminescence amount of said rare gas pipe by adjusting a quantity of electrons sending by said conductive member.

17. The image reading apparatus as recited in claim 16, wherein said conductive member is grounded via said variable resistor provided outside said rare gas pipe, and wherein said controller controls a luminescence amount of said rare gas pipe by controlling a resistance of said variable resistor.

18. The image reading apparatus as recited in claim 15, wherein said conductive member is a wire-like conductive member disposed extending from one end of said rare gas pipe to the other end thereof.

19. An image forming apparatus, comprising:

a photosensitive member; and a light source for exposing a photosensitive member corresponding to an image data, wherein said light source includes said rare gas pipe in which rare gas is sealed, a pair of external electrodes formed on an outer peripheral surface of said rare gas pipe and a plurality of conductive members which contact said pair of external electrodes and are arranged at predetermined intervals in an axial direction of said rare gas pipe.

20. The image forming apparatus as recited in claim 19, further comprising a switch for switching whether or not said conductive member is grounded, a controller for controlling whether or not said rare gas pipe is made to emit light by switching said switch.

* * * * *